UNITED STATES PATENT OFFICE.

FRANK JONES, OF MORSE, KANSAS.

PROCESS OF DISINFECTING TREES, &c.

SPECIFICATION forming part of Letters Patent No. 440,612, dated November 11, 1890.

Application filed September 8, 1890. Serial No. 364,338. (No specimens.)

*To all whom it may concern:*

Be it known that I, FRANK JONES, a citizen of the United States, residing at Morse, in the county of Johnson and State of Kansas, have invented a new and useful Process of Disinfecting for Destroying Insects on Trees and Plants, of which the following is a specification.

My improved process of disinfecting trees, plants, &c., consists in washing the body and limbs of the plant or tree with a mixture or compound composed of the following ingredients in the specified proportion, to wit: soft water, five gallons; indigo, dissolved in the water, one ounce; asafetida tincture, three ounces; soap, dissolved in the water, two one-pound bars, and at or about the same time drenching the roots of the tree with the following drench mixture applied in connection with sulphur, as hereinafter specified, to wit: water, five gallons; concentrated lye, sixteen ounces; indigo, one and one-half ounce; camphor tincture, four ounces, and sulphur, a sufficient quantity.

In practice the sulphur is not mixed with the compound except in the act of applying, and the method of applying is as follows: In treating a tree six inches in diameter I first sprinkle about four ounces of sulphur upon the ground close around the foot of the tree. I then pour about six quarts of the drench mixture upon the sulphur around the root of the tree. The drench is absorbed by the roots of the tree, and, being carried to the bark and leaves of the tree, combines with the wash above mentioned, which has been applied to the trunk, and the result is effective in destroying all insect life upon the tree, while the leaves, bark, and fruit remain uninjured.

The amount of sulphur and drench mixture to be used for each tree will vary with the size of the tree to be disinfected.

The sulphur is not absolutely essential, and I do not wish to be limited by its use.

Now having described my invention, what I claim as new, and desire to secure by Letters Patent, is—

1. The process, substantially as herein described, of disinfecting trees or plants, which consists in washing the body and limbs with a mixture of water, indigo, soap, and asafetida tincture and drenching the roots with a mixture of water, concentrated lye, indigo, and camphor tincture.

2. The process, substantially as herein described, of disinfecting trees or plants, which consists in washing the body and limbs with a mixture of water, indigo, soap, and asafetida tincture and drenching the roots with a mixture of water, concentrated lye, indigo, camphor tincture, and sulphur.

FRANK JONES.

Witnesses:
JAMES R. TOWNSEND,
ALFRED I. TOWNSEND.